(12) United States Patent
Suzuka

(10) Patent No.: US 6,445,887 B1
(45) Date of Patent: Sep. 3, 2002

(54) VIEWFINDER FOR CAMERA WITH ADJUSTABLE DIOPTER

(75) Inventor: Shinya Suzuka, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 149 days.

(21) Appl. No.: 09/598,448

(22) Filed: Jun. 22, 2000

(30) Foreign Application Priority Data

Jun. 23, 1999 (JP) ............................................ 11-176694

(51) Int. Cl.$^7$ ............................................. G03B 13/02
(52) U.S. Cl. ....................... 396/373; 396/378; 396/384; 396/386
(58) Field of Search ................................ 396/373, 374, 396/377, 378, 379, 380, 381, 383, 384, 385, 386

(56) References Cited

U.S. PATENT DOCUMENTS

| | | | |
|---|---|---|---|
| 4,828,381 A | | 5/1989 | Shindo |
| 5,621,568 A | | 4/1997 | Hasushita et al. |
| 5,628,037 A | * | 5/1997 | Tsuyuki et al. ............. 396/140 |
| 6,006,038 A | * | 12/1999 | Kosako ........................ 396/29 |
| 6,169,859 B1 | * | 1/2001 | Omiya ........................ 396/373 |

* cited by examiner

Primary Examiner—David M. Gray
(74) Attorney, Agent, or Firm—Greenblum & Bernstein, P.L.C.

(57) ABSTRACT

A viewfinder for a camera with an adjustable diopter includes an objective lens and an eyepiece lens each having an optical axis extending parallel to a longitudinal axis of the camera. Light rays from the objective lens are reflected by a mirror and directed in one direction parallel to a transverse axis of the camera onto a focusing screen to form an object image. A first triangular prism receives light rays from the object image and reflects and directs the received light rays in opposite direction parallel to the transverse axis. A second triangular prism receives light rays from the first prism and reflects and directs the received light rays in the direction parallel to the longitudinal axis and toward the eyepiece lens. The first prism is supported and guided for linear displacement along the transverse axis, while the second prism is fixed to the body frame of the camera. A control knob operable by the camera operator is interconnected with the first prism through an interconnection mechanism composed of a two-arm lever and a spring cooperating with the lever. The interconnection mechanism responds to the operation of the control knob by causing linear displacement of the first prism along the transverse axis so as to change optical distance between the focusing screen and the eyepiece lens to achieve adjustment in diopter of the viewfinder.

25 Claims, 7 Drawing Sheets

VIEWFINDER FOR CAMERA WITH ADJUSTABLE DIOPTER

The present disclosure relates to subject matter contained in Japanese Patent Application No. Hei-11-176694 filed on Jun. 23, 1999, which is expressly incorporated herein by reference in its entirety.

BACKGROUND OF THE INVENTION

1. Field of the invention

The present invention relates to a viewfinder for a camera with an adjustable diopter.

2. Description of the Related Art

There have been proposed various types of viewfinders for use in film cameras, so-called CCD (charge coupled device) still cameras and video cameras. Such viewfinders include an eyepiece lens having its optical axis extending parallel to the optical axis of the taking lens of the camera. The camera operator can view the scene as it is being taken through the taking lens. For convenience to possible users who are subject to myopia or hyperopia, some viewfinders have an adjustable diopter to compensate for the differences in each camera operator's vision.

A typical viewfinder with an adjustable diopter has an eyepiece lens which is capable of displacement along its optical axis. By displacing the eyepiece lens along its optical axis, the optical distance (i.e., the distance along the optical path) between the eyepiece lens and an object image, which may be formed for example on a focusing screen, is changed so that adjustment in diopter of the viewfinder may be achieved.

The use of this diopter adjustment technique, however, often adds to the dimension of the camera in the direction of displacement of the eyepiece lens, which is inconvenient to many cameras, and in particular, to compact cameras, in which portability is one of the most important factors. Further, the use of the above technique may also result in the camera with its viewfinder protruded from its body, which is also inconvenient to compact cameras.

SUMMARY OF THE INVENTION

In view of the foregoing, it is an object of the present invention to provide a viewfinder for a camera with an adjustable diopter, which may be compact in construction and thus highly convenient for use in various cameras, and in particular, in compact cameras.

In accordance with an aspect of the present invention, there is provided a viewfinder for a camera with an adjustable diopter, the camera having a body frame and a taking lens, the taking lens having an optical axis which defines a longitudinal axis of the camera.

The viewfinder comprises: an objective lens mounted on the body frame and having an optical axis extending parallel to the longitudinal axis; an eyepiece lens mounted on the body frame and having an optical axis extending parallel to the longitudinal axis; a focusing screen mounted on the body frame and having a surface on which an object image is formed through the objective lens; and a light-rays-directing optical system mounted on the body frame, for causing light rays from the object image to be directed in a first direction parallel to a predefined transverse axis extending transversely with respect to the longitudinal axis.

The viewfinder further comprises: a first reflective optical element for receiving light rays from the object image and reflecting and directing the received light rays in a second direction opposite to the first direction parallel to the transverse axis; a first mechanism for supporting and guiding the first reflective optical element for linear displacement relative to the body frame and along the transverse axis; a second reflective optical element mounted on the body frame for receiving light rays from the first reflective optical element and reflecting and directing the received light rays in a direction parallel to the longitudinal axis and toward the eyepiece lens; a control knob provided for operation by a camera operator; and a second mechanism for responding to operation of the control knob by causing linear displacement of the first reflective optical element along the transverse axis so as to change optical distance between the focusing screen and the eyepiece lens to achieve adjustment in diopter of the viewfinder.

The control knob may be preferably supported for linear displacement. In such a case, the second mechanism may preferably comprise a mechanism for converting linear displacements of the control knob into linear displacements of the first reflective optical element while providing demagnification of displacement between them. Also, in such a case, the second mechanism may preferably comprise: a two-arm lever mounted on the body frame for pivotal movement and having first and second arms in engagement with the control knob and the first reflective optical element, respectively; and a spring normally urging the first reflective optical element so as to maintain engagement between the first arm and the control knob and engagement between the second arm and the first reflective optical element without any backlash in each engagement.

The control knob may have a knob body and a pin extending from the knob body. In such a case, the first arm of the two-arm lever may have a side edge, wherein the side edge is in engagement with the pin, wherein the side edge is shaped such that the pin and the side edge together form a cam mechanism for converting linear displacements of the control knob into pivotal movements of the two-arm lever.

The body frame may have an eyepiece window, which the eyepiece lens is received in and secured to. In such a case, the control knob may be mounted on the body frame at a position near the eyepiece window.

In a particularly advantageous embodiment, the body frame may include an optical element holder having a recess for receiving and holding the first reflective optical element, and the first mechanism may be provided on the optical element holder so that the first reflective optical element is supported and guided by the optical element holder. In such a case, the control knob may be supported for linear displacement. Further, the second mechanism may comprise: a two-arm lever mounted on the optical element holder for pivotal movement and having first and second arms in engagement with the control knob and the first reflective optical element, respectively; and a spring mounted on the optical element holder and normally urging the first reflective optical element so as to maintain engagement between the first arm and the control knob and engagement between the second arm and the first reflective optical element without any backlash in each engagement.

In accordance with another aspect of the present invention, there is provided a diopter adjustment mechanism for use in a viewfinder of a camera, wherein the viewfinder comprises a plurality of optical elements including a movable optical element, wherein adjustment in diopter of the viewfinder is achieved by linear displacement of the movable optical element along a predefined axis.

The diopter adjustment mechanism comprises: an optical element holder having a recess for receiving and holding the movable optical element; a first mechanism provided on the optical element holder, for supporting and guiding the movable optical element for linear displacement along the axis; a control knob provided for operation by a camera operator; and a second mechanism for responding to operation of the control knob by causing linear displacement of the movable optical element along the axis so as to achieve adjustment in diopter of the viewfinder.

The control knob may be preferably supported for linear displacement. In such a case, the second mechanism may comprise a mechanism for converting linear displacements of the control knob into linear displacements of the movable optical element while providing demagnification of displacement between them. Also, in such a case, the second mechanism may comprises: a two-arm lever mounted on the optical element holder for pivotal movement and having first and second arms in engagement with the control knob and the movable optical element, respectively; and a spring mounted on the optical element holder and normally urging the movable optical element so as to maintain engagement between the first arm and the control knob and engagement between the second arm and the movable optical element without any backlash in each engagement.

The control knob may have a knob body and a pin extending from the knob body. In such a case, the first arm of the two-arm lever may have a side edge, wherein the side edge is in engagement with the pin, wherein the side edge is shaped such that the pin and the side edge together form a cam mechanism for converting linear displacements of the control knob into pivotal movements of the two-arm lever.

In an embodiment, the optical element holder has a pair of trunnions. The two-arm lever has a pair of holes formed therein, for receiving the trunnions. Further, the spring is a helical torsion spring having a coiled portion fitted over one of the trunnions. In addition, the movable optical element may comprise a triangular prism serving as a reflective optical element.

BRIEF DESCRIPTION OF THE DRAWINGS

The above and other objects, features and advantages of the present invention will be apparent from the following detailed description of a preferred embodiment thereof, reference being made to the accompanying drawings, in which.

DETAILED DESCRIPTION OF A PREFERRED EMBODIMENT

Referring now to the accompanying drawings, a viewfinder for a camera in accordance with a preferred embodiment of the present invention is described in detail.

Figure 1:
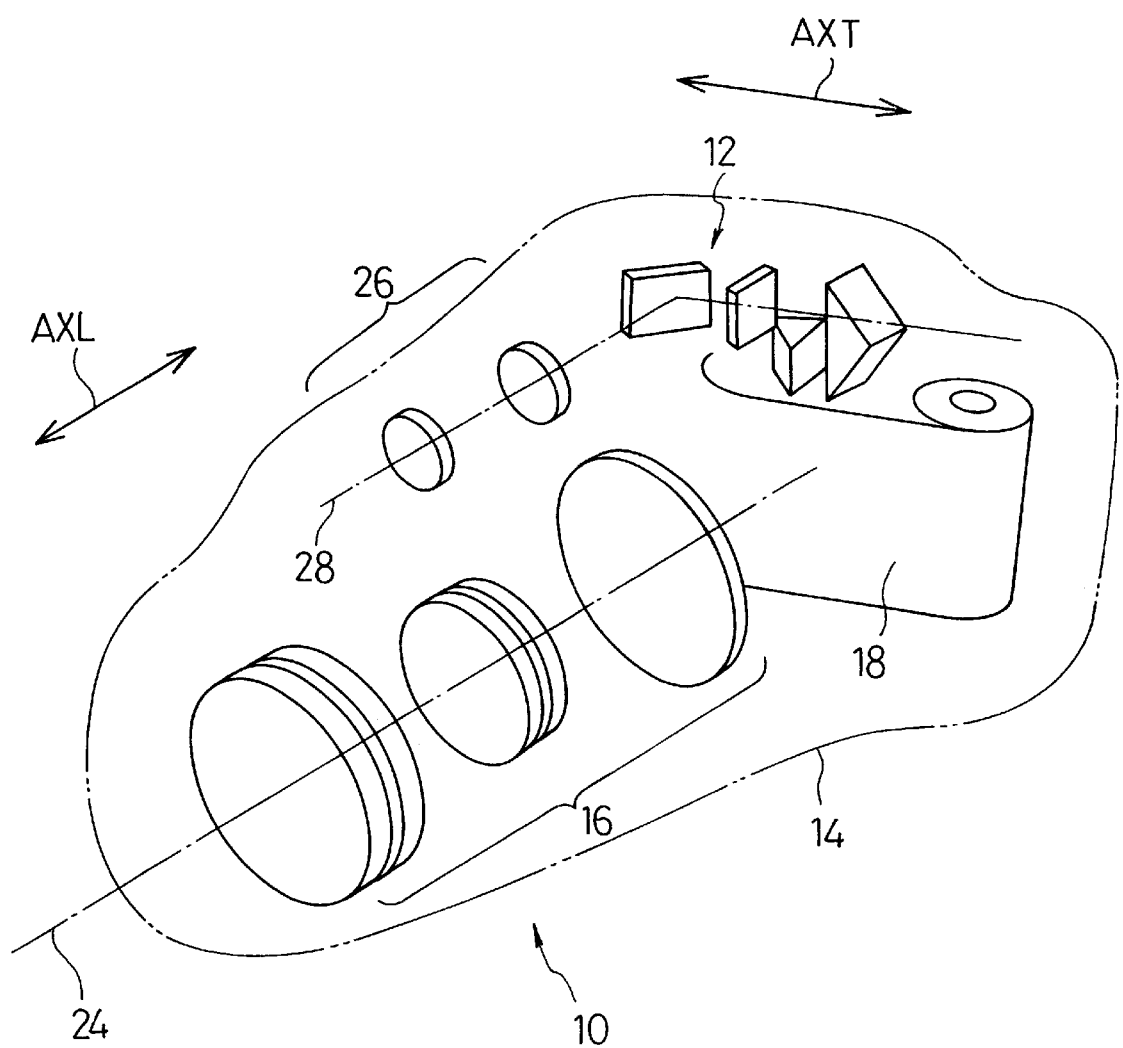
FIG. 1 is a schematic perspective view of a so-called zoom compact camera using a viewfinder constructed and arranged in accordance with a preferred embodiment of the present invention.
Figure 3:
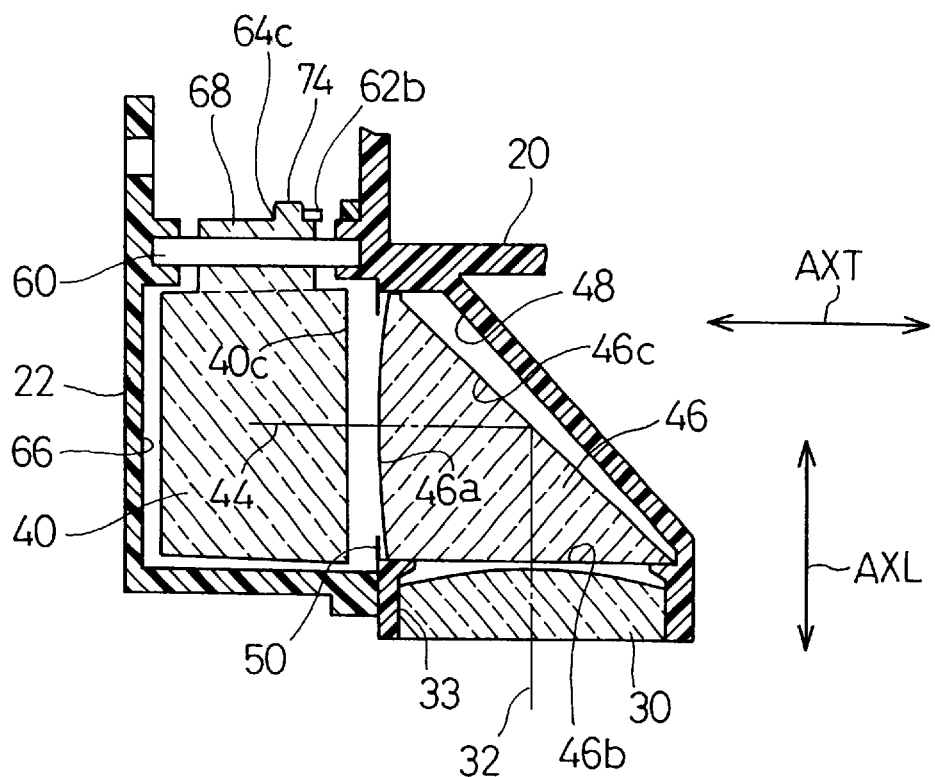
FIG. 3 is a partial plan view of the viewfinder of FIG. 1 showing some of the optical elements of the viewfinder.

FIG. 1 schematically shows a camera 10 using a viewfinder 12 constructed and arranged in accordance with a preferred embodiment of the present invention. The camera 10 has a body 14, only contour of which is shown by an imaginary line. The camera 10 is a so-called zoom compact camera having a zoom lens (taking lens) 16 for taking a picture on a film 18. The taking lens 16 has a between-the-lens diaphragm shutter (not shown) incorporated therein. The camera 10 has a body frame on which various components are mounted. The body frame is not shown in FIG. 1, while only a critical part of the body frame is shown in FIG. 3. The body frame is formed by combining separately fabricated components, among which a main part 20 and a prism holder 22 appear in FIG. 3. The prism holder 22 is described later in great detail.

Returning to FIG. 1, the taking lens 16 has an optical axis 24, which defines a longitudinal axis AXL of the camera 10. In the drawings, the direction of the longitudinal axis AXL is indicated by a double-point arrow with designation AXL.

The viewfinder 12 includes an objective lens 26, which is mounted on the body frame of the camera 10 in a known manner and has an optical axis 28 extending parallel to the longitudinal axis AXL of the camera. The objective lens 26 is a special kind of zoom lens including two lens elements 26a and 26b. The zooming operation of the objective lens 26 is linked with the zooming operation of the above mentioned zoom lens (taking lens) 16, so that the camera operator may view the scene to be filmed with an appropriate field of view provided by the viewfinder 12.

Figure 2:
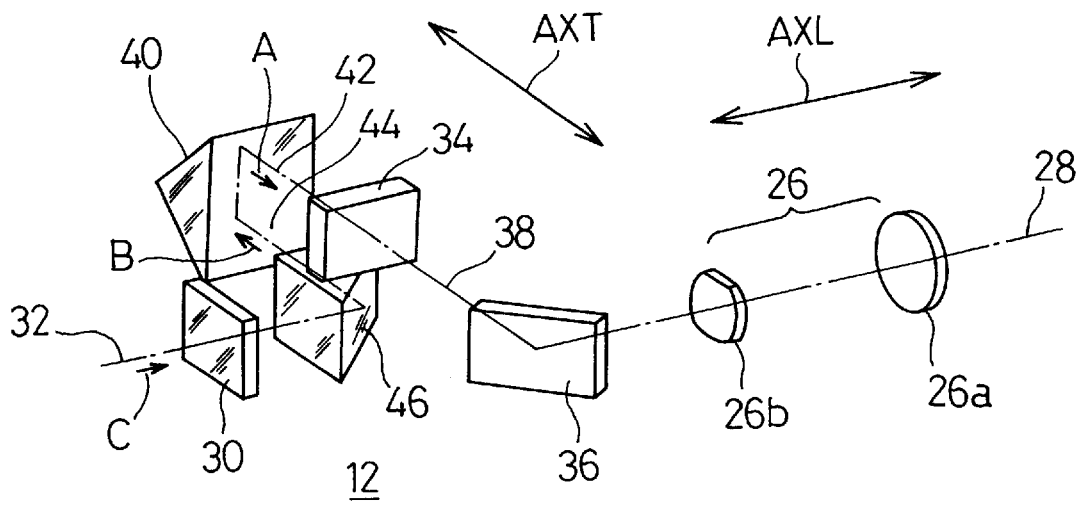
FIG. 2 schematically shows an arrangement of the optical system of the viewfinder of FIG. 1.

FIG. 2 schematically shows an arrangement of the optical system of the viewfinder 12. As shown, the viewfinder 12 further includes an eyepiece lens 30, which is mounted on the body frame and has an optical axis 32 extending parallel to the longitudinal axis AXL of the camera. As shown in FIG. 3, the main part 20 of the body frame has an eyepiece window 33, which the eyepiece lens 30 is received in and secured to.

The viewfinder 12 further includes a focusing screen 34, which is of a type as commonly used in single lens reflex (SLR) cameras. The focusing screen 34 has on one side thereof a grained ground glass surface, on which an object image may be formed through an image-forming lens. The focusing screen has on the other side thereof a convex surface, which serves to improve and distribute image brightness more evenly over the whole viewfinder image, as is well known in the art. The focusing screen 34 is mounted on the body fram in a known manner.

A mirror 36 is disposed along the optical axis 38 of the objective lens 26, mounted on the body frame and angled at an angle of forty-five degrees with respect to the optical axis 38. The mirror 36 receives light rays from the objective lens 26 and reflects and directs the received light rays in a transverse direction with respect the longitudinal axis AXL of the camera and toward the focusing screen 34. Accordingly, the mirror 36 is disposed along an optical path between the objective lens 26 and the focusing screen 36, serving to bend the optical path substantially at a right angle. That part of the optical path which extends from the mirror 36 to the focusing screen 34, designated in FIG. 2 by reference numeral 38, defines a predefined transverse axis AXT of the camera. The transverse axis AXT is used as another reference for the optical system of the viewfinder 12 in addition to the longitudinal axis AXL. In the drawings, the direction of the transverse axis AXT is designated by a double-point arrow with designation AXT.

With the mirror 36 thus disposed in the optical path, an object image is formed on the grounded glass surface of the focusing screen 34 through the objective lens 26. Light rays, emitting from the object image to the side of the focusing screen 34 opposite to the image-forming surface, are led to the eyepiece lens 30, so that the camera operator may view the object image through the eyepiece lens 30. The purpose of the mirror 36 is to cause light rays from the object image on the focusing screen 34 to be directed in a first direction parallel to the transverse axis AXT. This is described in more detail later.

The viewfinder 12 further includes a movable prism 40, referred to as the first prism hereinafter. The first prism 40 is a triangular prism having three functional sides, i.e., first, second and third functional sides 40a, 40b and 40c. The first and second sides 40a and 40b meet at a right angle and the third side 40c meets each of them at an angle of forty-five degrees (see FIG. 9A). The first and second sides 40a and 40b of the prism 40 provide reflective surfaces for light rays entering and leaving the prism 40, while the third side 40c provides an entrance/exit surface through which light rays enter and leave the prism 40. The third side 40c extends in vertical direction and faces the focusing screen 34. A straight line 42 passing through the center of the upper half of the third side 40c and normal to it forms an extension of the optical path 38 from the mirror 36 to the focusing screen 34, as shown in FIG. 2. The first side 40a is just above the second side 40b. Light rays emitting from the object image on the focusing screen 34 and entering the prism 40 along the optical path 42 are reflected by the first side 40a and then by the second side 40b to leave the prism 40. Light rays leaving the prism 40 follow a straight line 44 passing through the center of the lower half of the third side 40c and normal to it. Therefore, the first prism 40 receives light rays from the object image and reflects and directs the received light rays in a second direction opposite to the first direction parallel to the transverse axis AXT.

As shown in FIG. 1, with the disclosed embodiment the transverse axis AXT is predefined to extend in horizontal direction when the camera is held at its "normal position"; however, the present invention does not require that the transverse axis AXT should be so predefined. The transverse axis AXT is only required to be transverse with respect to the longitudinal axis AXL. For example, the viewfinder of the present invention may be designed to have the transverse axis extending in vertical direction when the camera is held at its normal position.

In addition, with the described embodiment, the mirror 36 is used to bend the optical axis between the objective lens 26 and the focusing screen 34. As described above, the purpose of the mirror 36 is, in deed, to cause light rays from the object image on the focusing screen 34 to be directed in the first direction parallel to the predefined transverse axis AXT. Thus, in place of the mirror 36, any other light-rays-directing optical system may be used for this purpose if appropriate. For example, such a light-rays-directing optical system may comprise a single triangular prism or, alternatively, a combination of mirror(s) and/or prism(s). Moreover, such a light-rays-directing optical system may be disposed not only between the object lens 26 and the focusing screen 34 as with the described embodiment but also between the focusing screen 34 and the first prism 40. For example, the described arrangement may be so modified as to reposition the focusing screen 34 into an appropriate position between the objective lens 26 and the mirror 36. In such case, the mirror 36 is disposed between the focusing screen 36 and the first prism 40.

As described above, the first prism 40 is a movable prism; it is supported and guided for displacement relative to the body frame and along the transverse axis AXT. The mechanism for supporting and guiding the first prism 40 is described later in detail with reference to FIGS. 3 to 9.

The viewfinder 12 further includes a fixed prism 46, referred to as the second prism hereinafter. The second prism 46 is fixedly mounted on the body frame of the camera 10 and disposed adjacent the first prism 40. As shown in FIG. 3, the second prism 46 is a triangular prism having three functional sides, i.e., first, second and third functional sides 46a, 46b and 46c. The first and second sides 46a and 46b meet at a right angle and the third side 46c meets each of them at an angle of forty-five degrees. The first side 46a is so shaped as to be a slightly convex surface serving as a lens with a positive power to provide image magnification.

The second prism 46 is disposed, as shown in FIG. 3, such that the lower half of the third side 40c of the first prism 40 and the first side 46a of the second prism 46 face each other with a small gap left between them, and that the second side 46b of the second prism 46 and the eyepiece lens 30 face each other. The size of the gap is variable depending on displacement of the first prism 40 along the transverse axis AXT of the camera toward and away from the second prism 46.

The first and second sides 46a and 46b of the second prism 46 provide entrance and exit surfaces, respectively, for light rays received from the first prism 40. The third side 46c provides a reflection surface for reflecting light rays entering the prism 46 through the first side 46a and directing them in the direction parallel to the longitudinal axis AXL and toward the eyepiece lens 30. Therefore, the second prism 46 receives light rays from the first prism 40 and reflects and directs the received light rays in this direction.

The eyepiece lens 30 is disposed close to the second side 46b of the second prism 46. The camera operator looks into the viewfinder 12 through the eyepiece lens 30 to view the object image formed on the focusing screen and thus the scene being filmed. The power of the first side 46a of the second prism 46 and the power of the eyepiece lens 30 together provide magnification of the object image formed on the focusing screen 34 for camera operator's viewing.

As shown in FIG. 3, the main part 20 of the body frame has a receptacle 48 formed therein for receiving the second prism 46. The receptacle 48 has an open top through which the second prism 46 is inserted therein. The receptacle 48 is so formed as to secure the second prism 46 in position and has first and second windows for the first and second sides 46a and 46b, respectively, of the second prism 46. A field stop 50 is attached to the first window in order to define the field of view of the viewfinder 10.

Some of the optical elements described above provide inversion or reversal of the image. Specifically: the objective lens 26 provides inversion; the mirror 36 provides left to right reversal; the first prism 40 provides inversion; and the second prism 46 provides left to right reversal (as well as image magnification). In contrast, the focusing screen 34 provides neither inversion nor reversal but provides only an image-forming surface. Also, the eyepiece lens 30 provides neither inversion nor reversal but provides only image magnification.

As the result, the object image formed on the focusing screen 34, as viewed from the eyepiece side thereof (as indicated by an arrow A in FIG. 2), is reversed upside down and not reversed left to right. The object image as viewed just through the first prism (as indicated by an arrow B in FIG. 2) is upright but reversed left to right. Finally, the object image as viewed through the second prism 46 and thus through the eyepiece 30 (as indicated by an arrow C in FIG. 2) is upright and the right way round.

As described above, the first prism 40 is capable of displacement along the transverse axis AXT of the camera. Such displacement results in variation in optical distance (i.e., the distance along the optical path) between the focusing screen 34 and the eyepiece lens 30, which in turn leads to a desired diopter adjustment in order to compensate for the camera operator's vision, which may be possibly subject to myopia or hyperopia. For the purposes, the viewfinder 12 includes: a first mechanism for supporting and guiding the first prism 40 for linear displacement relative to the body frame and along the transverse axis AXT; a control knob 52 provided on the body frame for operation by a camera operator; and a second mechanism for responding to operation of the control knob 52 by causing linear displacement of the first prism 40 along the transverse axis AXT so as to change optical distance between the focusing screen 34 and the eyepiece lens 30 to achieve adjustment in diopter of the viewfinder 12.

The first and second mechanisms are incorporated in an assembly 54 composed of the prism holder 22, the first prism 40 received in the prism holder 22, as well as other components described below. The assembly 54 is shown assembled and exploded, respectively, in FIGS. 6 and 7. The first and second mechanisms may be hereinafter referred to as the "prism support/guide mechanism" and the "prism position setting mechanism", respectively.

Figure 4:
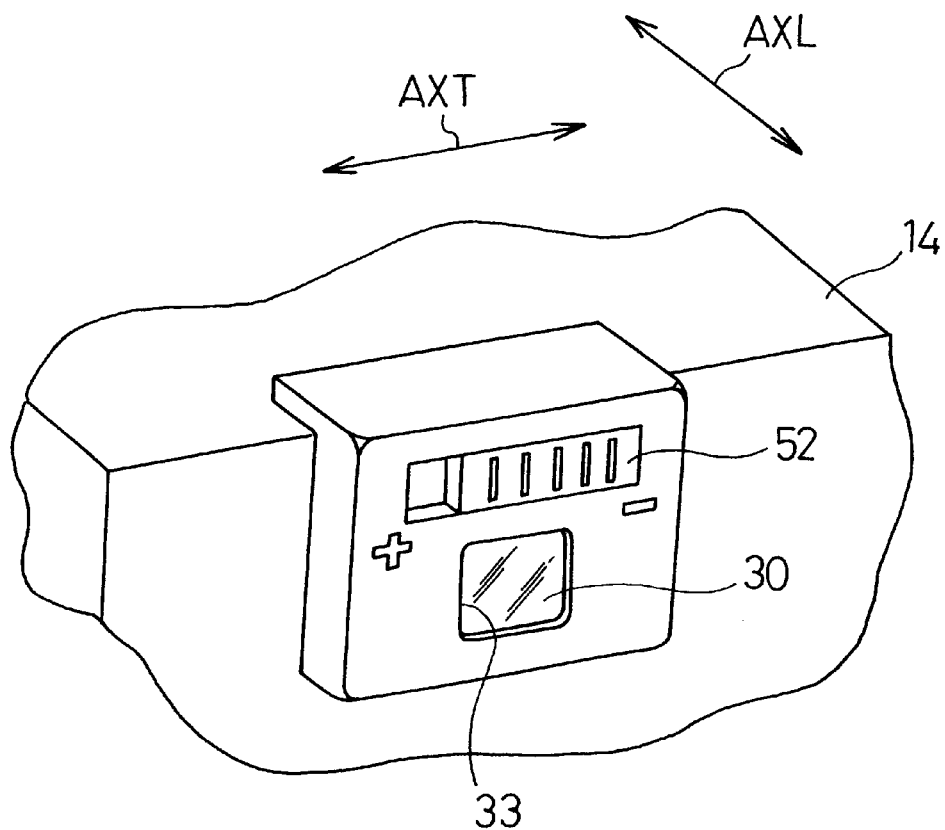
FIG. 4 shows a part of the body of the camera of FIG. 1 including a control knob and an eyepiece lens.
Figure 5:
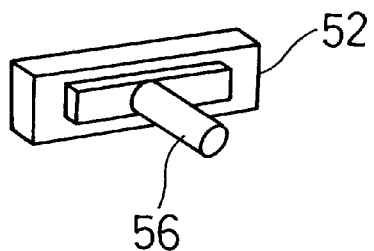
FIG. 5 shows the control knob of FIG. 4 as viewed from a different angle.

The control knob 52 is mounted on the body frame at a position near and just above the eyepiece window 33, as shown in FIG. 4. Further, the control knob 52 is supported and guided by the body frame for linear displacement along the transverse axis AXT, in such a manner as to allow the camera operator to quickly operate it with his/her finger tip for displacement. As shown in FIG. 5, the control knob 52 has a knob body and a pin 56 extending from the knob body. The pin 56 extends to the inside of the camera body 14 when the control knob 52 is mounted on the body frame. The pin 56 is also shown schematically in FIG. 8.

Figure 6:
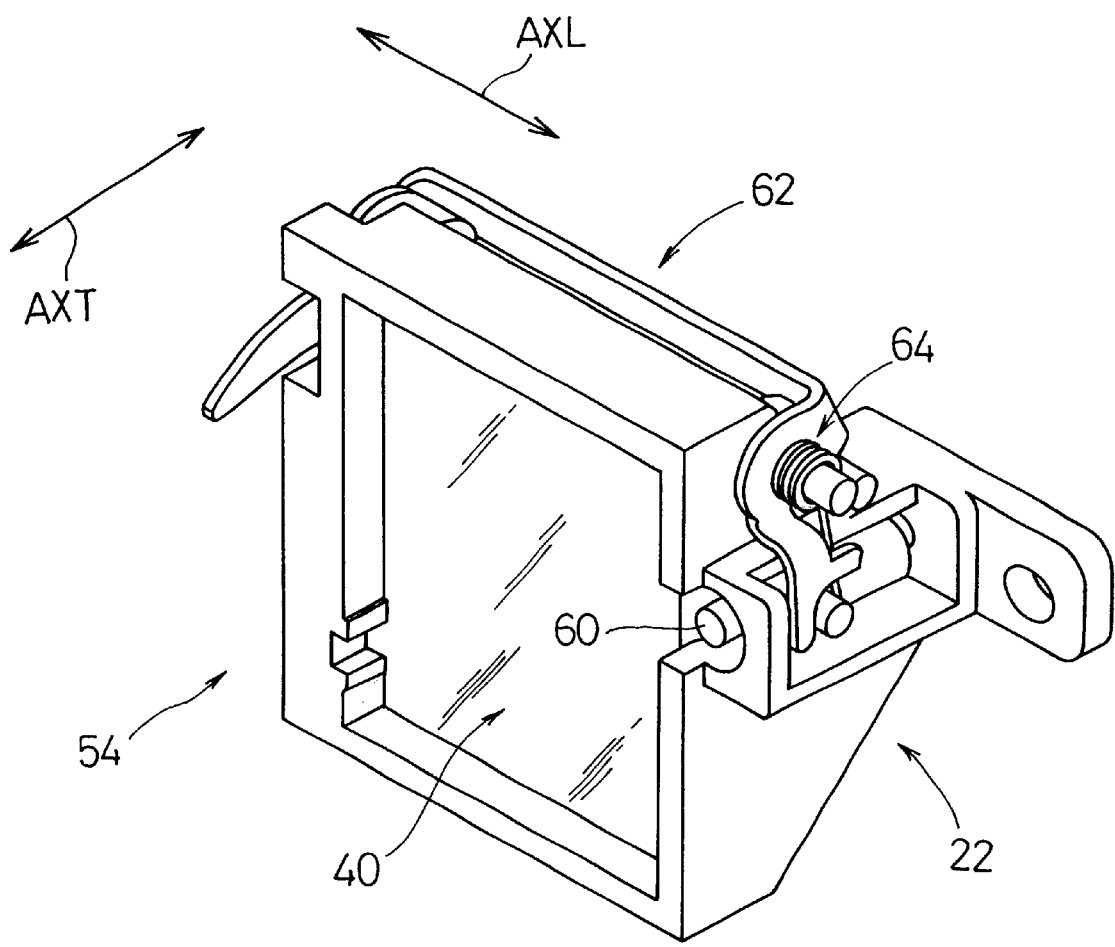
FIG. 6 is a perspective view of an assembly used in the camera of FIG. 1 including a prism holder, a triangular prism received in the prism holder, a two-arm lever mounted on the prism holder and a helical torsion spring mounted on the prism holder.
Figure 7:
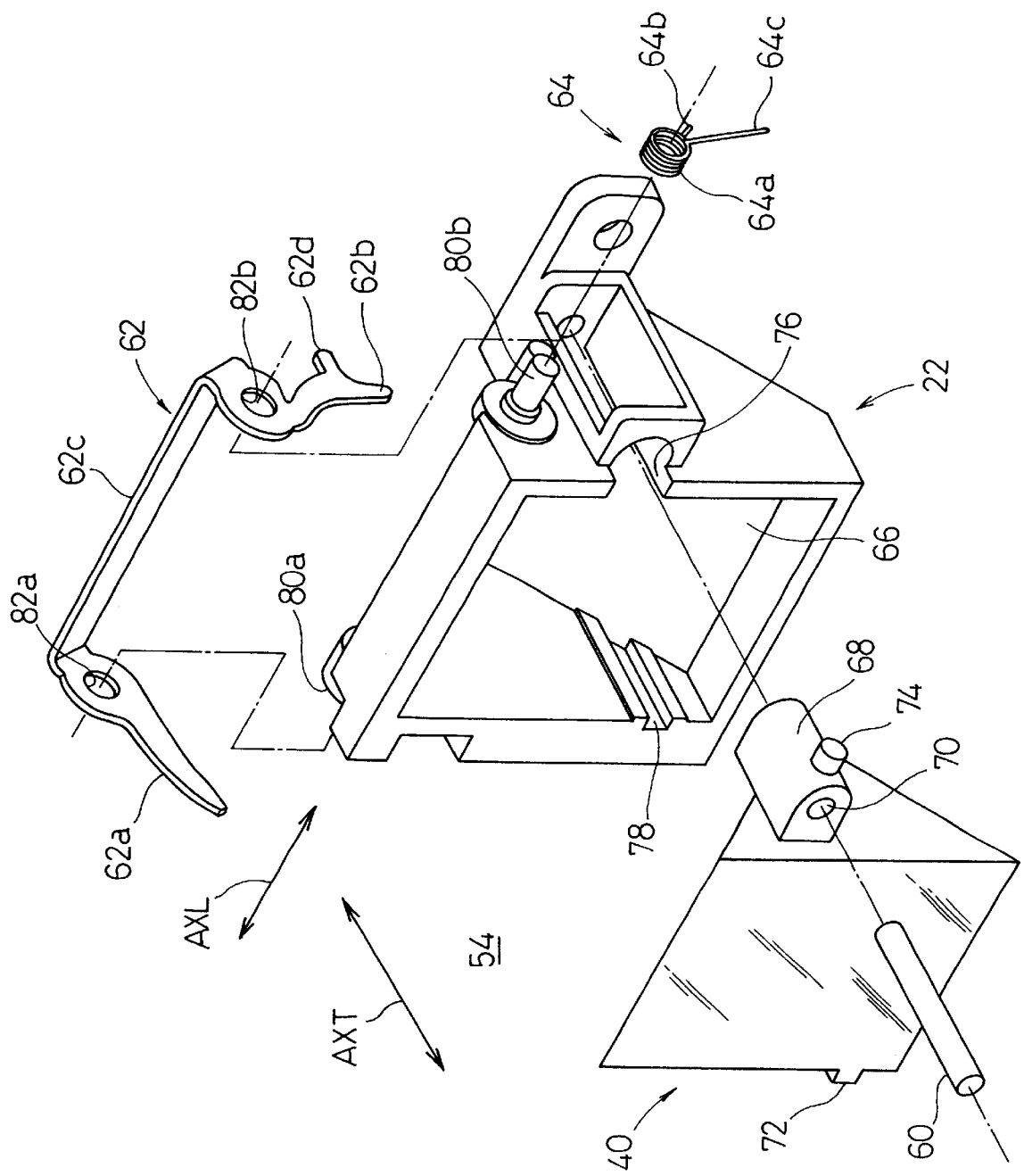
FIG. 7 is an exploded view of the assembly of FIG. 6.

Referring now to FIGS. 3 and 6 to 9, the assembly 54 will be described in greater detail. The assembly 54 includes, in addition to the prism holder 22 and the first prism 40 mentioned above, a guide rod 60, a two-arm lever 62 and a helical torsion spring 64 as best shown in FIGS. 6 and 7. The prism holder 22 has a recess 66 for receiving and holding the first prism 40. The recess 66 has a shape generally corresponding to the shape of the first prism 40 and is so sized as to entirely enclose the first prism 40, and has an open side facing the focusing screen 34 and the second prism 46. The first prism 40 is supported and guided by the prism holder 22 for linear displacement along the transverse axis AXT, as detailed below.

Specifically, as shown in FIGS. 6 and 7, the first prism 40 has a pair of triangular sides extending generally parallel to each other and in vertical direction. Correspondingly, the recess 66 of the prism holder 22 has a pair of triangular walls facing the triangular sides of the first prism 40. The triangular walls of the prism holder 22 extend parallel to each other, parallel to the transverse axis AXT and in vertical direction.

The first prism 40 has an upper horizontal ridge 68 formed on one triangular side near the upper end of that side. The upper horizontal ridge 68 has a horizontal hole 70 formed therein for receiving the guide rod 60. The first prism 40 also has a lower horizontal ridge 72 formed on the other triangular side near the lower end of that side. The lower horizontal ridge 72 has a rectangular cross section. The first prism 40 also has a pin 74 formed on the outermost side of the upper horizontal ridge 68 and extruding horizontally therefrom, for engaging with the helical torsion spring 64.

The prism holder 22 has a horizontal, elongated cutout 76 formed in one triangular wall, for receiving the upper horizontal ridge 68 of the first prism 40 with an allowance or gap left between them, as well as for allowing the pin 74 of the first prism 40 to extend out of the prism holder 22. The prism holder 22 has a horizontal guide groove 78 formed in the other triangular wall, for receiving the lower horizontal ridge 72 of the first prism 40 with substantially no allowance left between them. When the viewfinder 12 is assembled, the guide rod 60 is inserted in and extends through the horizontal hole 70 of the first prism 40. The guide rod 60 is supported at its opposite ends by the prism holder 22 and the main part 20 of the body frame, as seen from FIG. 3, to extend parallel to the transverse axis AXT. Thus, the prism support/guide mechanism for supporting and guiding the first prism 40 for displacement along the transverse axis AXT is composed of the combination of the guide rod and hole structure and the guide groove and ridge structure, both provided between the prism holder 22 and the first prism 40.

The prism position setting mechanism, which allows the camera operator to set the first prism 40 at a desired position along the transverse axis AXT, is described now in detail. The prism position setting mechanism is composed of the control knob 52, the two-arm lever 62 and the helical torsion spring 64. Briefly, the prism position setting mechanism serves to convert linear displacements of the control knob 52 into linear displacements of the first prism 40 while providing demagnification of displacement between them. Further, the mechanism provides operative interconnection between the control knob 52 and the first prism 40 with no backlash.

More specifically, the two-arm lever 62 is made from a thin plate of spring steel and has a first arm 62a, a second arm 62b and a connection portion 62c interconnecting the proximal ends of the arms 62a and 62b. The two-arm lever 62 is attached to the prism holder 22 for pivotal movement about a horizontal pivotal axis extending parallel to the longitudinal axis AXL of the camera. For this pivotal attachment, the prism holder 22 has a pair of trunnions 80a and 80b provided on the opposite sidewalls at positions near the top of the prism holder 22. Correspondingly, the lever 62 has a pair of holes 82a and 82b for receiving the trunnions 80a and 80b, which are formed in the proximal ends of the first and second arms 62a and 62b, respectively. With this arrangement, the trunnions 80a and 80b define the horizontal pivotal axis for the pivotal movement of the lever 62. The first and second arms 62a and 62b are in engagement with the pin 56 of the control knob 52 and the pin 74 of the first prism 40, respectively. Each engagement is maintained by means of the helical torsion spring 64 as described below.

The helical torsion spring 64 has a coiled portion 64a with a first, shorter end arm 64b and a second, longer end arm 64c extending from the coiled portion 64a. The coiled portion 60a is fitted over one of the trunnions, 80b, of the prism holder 22. The spring 64 is set preloaded such that the first and second end arms 64b and 64c are kept in engagement with the prism holder 22 and the pin 74 of the first prism 40, respectively, by means of the urging force of the preloaded spring 64 itself. In this manner, the second end arm 64c of the spring 64 normally urges the first prism 40 in one direction parallel to the transverse axis AXT, i.e., in the direction from the bottom of the recess 66 to the open side of the prism holder 22. Therefore, the spring 64 normally urges the first prism 40 toward the focusing screen 34 and toward the second prism 46 after the assembly 54 is attached to the main part 20 of the body frame.

Figure 9A:
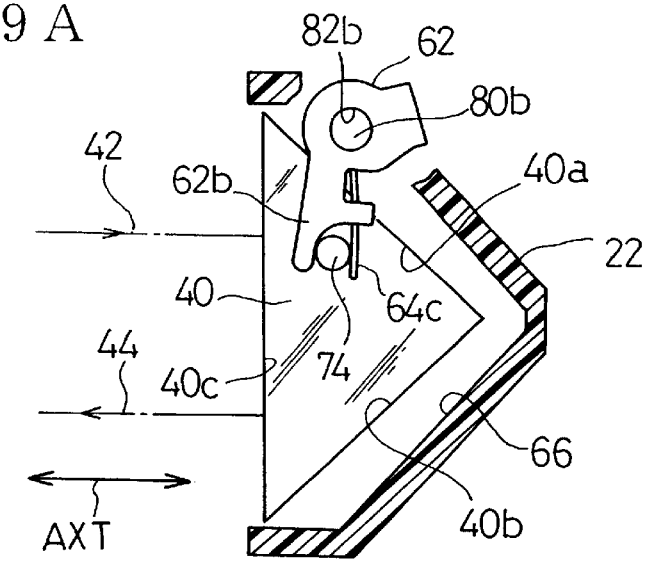
FIGS. 9A to 9C are schematic side elevations of the assembly of FIG. 6 as viewed from the other side, illustrating swinging movement of a second arm of the two-arm lever and corresponding displacements of the triangular prism for diopter adjustment.
Figure 9B:
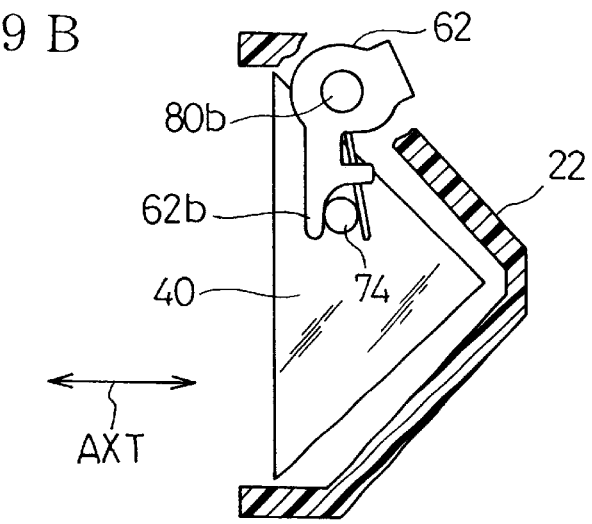
Figure 9C:
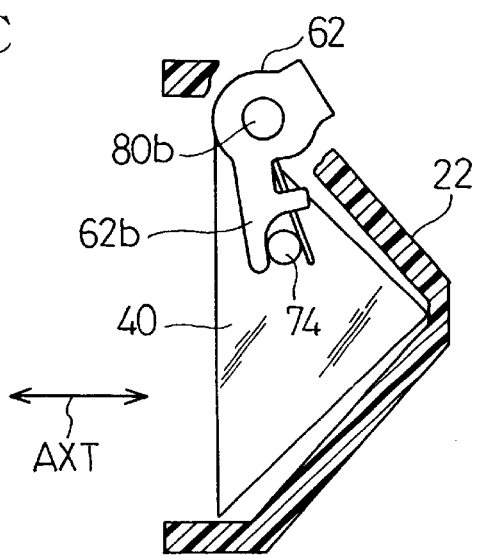

The second arm 62b of the two-arm lever 62 extends generally downward, so that it swings generally in horizontal direction when the two-arm lever 62 rotates about its pivotal axis. The second arm 62b has one of its side edges in engagement with the pin 74 of the first prism 40 such that the second arm 62b and the second end arm 64c of the spring 64 are in engagement with the opposite sides of the pin 74, as best shown in FIGS. 9A to 9C. The second arm 62b further has a finger 62d for retaining the spring 64 fitted over the trunnion 80b.

The first arm 62a of the two-arm lever 62 extends generally horizontally, so that it swings generally in vertical direction when the two-arm lever 62 rotates about its pivotal axis. The first arm 62a has one of its side edges, the upper side edge, in engagement with the bottom side of the pin 56 of the control knob 52.

The helical torsion spring 64 normally urges the pin 74 of the first prism 40 against the second arm 62b of the lever 62, which in turn causes the first arm 62a of the lever 62 to be normally urged against the pin 56 of the control knob 52. Therefore, both of the engagement between the first arm 62a and the pin 56 of the control knob 52 and the engagement between the second arm 62b and the pin 74 of the first prism 40 are maintained by the urging force normally provided by the spring 64, with any backlash being eliminated in each engagement.

Figure 8:
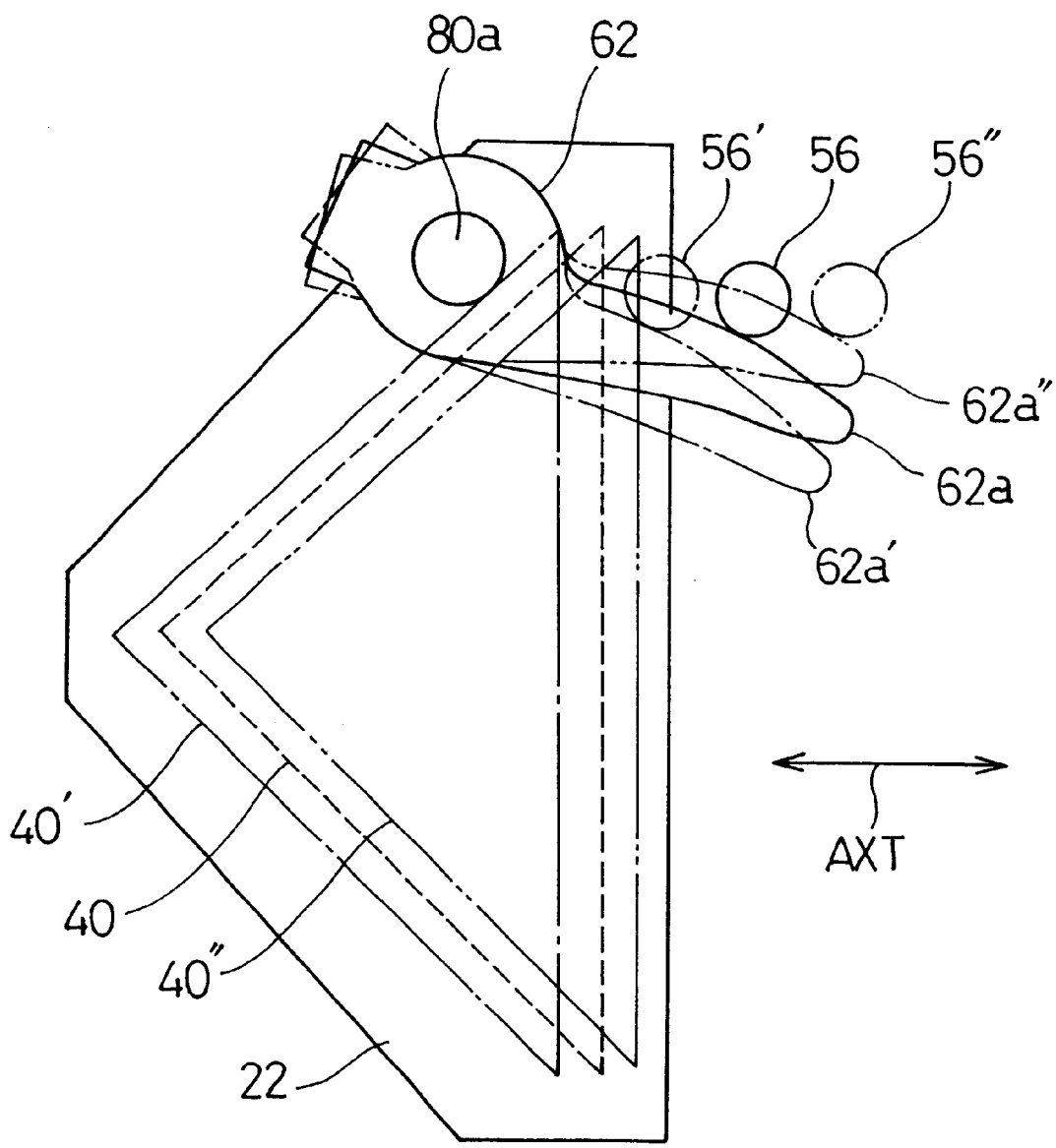
FIG. 8 is a schematic side elevation of the assembly of FIG. 6, illustrating swinging movement of a first arm of the two-arm lever and corresponding displacements of the triangular prism for diopter adjustment.

The upper side edge of the first arm 62a of the two-arm lever 62 is formed into a curved shape such that the upper side edge of the first arm 62a and the pin 56 in engagement therewith together form a cam mechanism. This operation of the cam mechanism is illustrated in FIG. 8, in which solid lines with designations 62a and 56 show the positions of the first arm 62a and the pin 56 when the control knob 52 is set to the midpoint in its adjustable range. Dot-and-dash lines with designations 62a' and 56' show their positions when the control knob 52 is set to the leftmost position in its adjustable range as viewed by the camera operator. Imaginary lines with designations 62a" and 56" show their positions when the control knob 52 is set to the rightmost position in its adjustable range as viewed by the camera operator, which is illustrated in FIG. 4. As seen from FIG. 8, the cam mechanism converts linear displacements of the pin 56 caused by the camera operator into relatively minute vertical swinging movements of the first arm 62a and thus into relatively minute rotational movements of the two-arm lever 62.

FIGS. 9A to 9C illustrate three positions of the first prism 40 corresponding to the three positions of the pin 56, as designated by 56, 56' and 56", respectively, in FIG. 8. When the control knob 52 is set to the rightmost position as viewed by the camera operator, the first prism 40 is set to the position shown in FIG. 9A, which position is also shown in FIG. 8 by imaginary lines with designation 40". When the control knob 52 is set to the midpoint in its adjustable range, the first prism 40 is set to the position shown in FIG. 9B, which position is also shown in FIG. 8 by broken lines with designation 40. When the control knob 52 is set to the leftmost position as viewed by the camera operator, the first prism 40 is set to the position shown in FIG. 9C, which position is also shown in FIG. 8 by dot-and-dash lines with designation 40'. The control knob 52 may be set at any desired position in its adjustable range, so that the position of the first prism 40 may be set at any desired position between the limit positions shown in FIGS. 9A and 9B, respectively.

When the first prism 40 is at the position shown in FIG. 9A, it is closest to the focusing screen 34 and the second prism 46, so that the optical distance between the focusing screen 34 and the eyepiece lens 30 is shortest. This is the condition that the viewfinder 12 has the minimum diopter, which may be suitable for the camera operator if he/she is subject to severe myopia. In contrast, when the first prism 40 is at the position shown in FIG. 9C, it is furthest from the focusing screen 34 and the second prism 46, so that the optical distance between the focusing screen 34 and the eyepiece lens 30 is longest. This is the condition that the viewfinder 12 has the maximum diopter, which may be suitable for the camera operator if he/she is subject to severe hyperopia. By operating the control knob 52, the camera operator can set the first prism 40 at a position for achieving the optimum diopter for his/her vision. In order to facilitate the camera operator to make diopter adjustment, plus and minus signs are embossed on the body frame at positions near the control knob 52, as shown in FIG. 4. These signs indicate the direction to operate the control knob 52 for the desired diopter adjustment.

In the above arrangement, the first prism 40 is used not as a refractive optical element but as a reflective optical element. That is, the first prism 40 serves to bend the optical path twice not by refracting but reflecting the light rays. Thus, it is contemplated that the first prism 40 may be replaced by any other reflective optical element(s) if appropriate. For example, it may be simply replaced by a combination of two mirrors meeting at a right angle. It may be also replaced by a single mirror if corresponding modifications would be effected to the other portions of the optical system of the viewfinder. Similarly, the second prism 46 may be replaced by a combination of a lens and a mirror. Alternatively, the second prism 46 may be replaced by only a mirror, with corresponding modifications being made to the other portions of the optical system. Any of such alterations and modifications to the optical system of the viewfinder are included in the scope of the present invention.

As understood from the above and as best seen from FIG. 8, the prism position setting mechanism, which uses the two-arm lever 62 and the spring 64, provides demagnification of displacement between the control knob 52 and the first prism 40 so that quick, smooth and precise diopter adjustment may be achieved. The use of the assembly 54, which may be almost finished before attachment to the main part 20 of the body frame, contributes to easiness in fabrication of the camera utilizing the viewfinder of the present invention. The prism holder 22, which entirely encloses the first prism 40, may serve to protect some of the optical elements of the viewfinder from dust particles, which may possibly enter the camera body. The structure and arrangement for diopter adjustment of the viewfinder is highly compact, so that the disclosed structure and arrangement is suitable for use in various cameras, and in particular in compact cameras.

Having described the present invention with reference to the preferred embodiment thereof, it is to be understood that the present invention is not limited to the disclosed embodiment, but may be embodied in various other forms without departing from the spirit and the scope of the present invention as defined by the appended claims.

What is claimed is:

1. A viewfinder for a camera with an adjustable diopter, said camera having a body frame and a taking lens, said taking lens having an optical axis which defines a longitudinal axis of said camera, said viewfinder comprising:

an objective lens mounted on said body frame and having an optical axis extending parallel to said longitudinal axis;

an eyepiece lens mounted on said body frame and having an optical axis extending parallel to said longitudinal axis;

a focusing screen mounted on said body frame and having a surface on which an object image is formed through said objective lens;

a light-rays-directing optical system mounted on said body frame, for causing light rays from said object image to be directed in a first direction parallel to a predefined transverse axis extending transversely with respect to said longitudinal axis;

a first reflective optical element for receiving light rays from said object image and reflecting and directing the received light rays in a second direction opposite to said first direction parallel to said transverse axis;

a first mechanism for supporting and guiding said first reflective optical element for linear displacement relative to said body frame and along said transverse axis;

a second reflective optical element mounted on said body frame for receiving light rays from said first reflective optical element and reflecting and directing the received light rays in a direction parallel to said longitudinal axis and toward said eyepiece lens;

a control knob provided for operation by a camera operator; and a second mechanism for responding to operation of said control knob by causing linear displacement of said first reflective optical element along said transverse axis so as to change optical distance between said focusing screen and said eyepiece lens to achieve adjustment in diopter of said viewfinder.

2. A viewfinder according to claim 1, wherein:

said control knob is supported for linear displacement; and said second mechanism comprises a mechanism for converting linear displacements of said control knob into linear displacements of said first reflective optical element while providing demagnification of displacement between them.

3. A viewfinder according to claim 1, wherein:

said control knob is supported for linear displacement; and said second mechanism comprises:

a two-arm lever mounted on said body frame for pivotal movement and having first and second arms in engagement with said control knob and said first reflective optical element, respectively; and a spring normally urging said first reflective optical element so as to maintain engagement between said first arm and said control knob and engagement between said second arm and said first reflective optical element without any backlash in each engagement.

4. A viewfinder according to claim 3, wherein:

said control knob has a knob body and a pin extending from said knob body; and said first arm of said two-arm lever has a side edge, wherein said side edge is in engagement with said pin, wherein said side edge is shaped such that said pin and said side edge together form a cam mechanism for converting linear displacements of said control knob into pivotal movements of said two-arm lever.

5. A viewfinder according to claim 1, wherein:

said first reflective optical element comprises a first triangular prism having first, second and third functional sides, wherein said first and second functional sides meet at a right angle and said third functional side meets each of said first and second functional sides at an angle of forty-five degrees, wherein said third functional side faces said focusing screen and said second reflective optical element.

6. A viewfinder according to claim 5, wherein:

said second reflective optical element comprises a second triangular prism having first, second and third functional sides, wherein said first and second functional sides of said second triangular prism meet at a right angle and said third functional side of said second triangular prism meets each of said first and second functional sides of said second triangular prism at an angle of forty-five degrees, wherein said first and second functional sides of said second triangular prism face said third functional side of said first triangular prism and said eyepiece lens, respectively.

7. A viewfinder according to claim 1, wherein:

said body frame has an eyepiece window, which said eyepiece lens is received in and secured to; and said control knob is mounted on said body frame at a position near said eyepiece window.

8. A viewfinder according to claim 1, wherein:

said body frame includes an optical element holder having a recess for receiving and holding said first reflective optical element; and said first mechanism is provided on said optical element holder so that said first reflective optical element is supported and guided by said optical element holder.

9. A viewfinder according to claim 8, wherein:

said control knob is supported for linear displacement; and said second mechanism comprises:

a two-arm lever mounted on said optical element holder for pivotal movement and having first and second arms in engagement with said control knob and said first reflective optical element, respectively; and a spring mounted on said optical element holder and normally urging said first reflective optical element so as to maintain engagement between said first arm and said control knob and engagement between said second arm and said first reflective optical element without any backlash in each engagement.

10. A viewfinder according to claim 9, wherein:

said control knob has a knob body and a pin extending from said knob body; and said first arm of said two-arm lever has a side edge, wherein said side edge is in engagement with said pin, wherein said side edge is shaped such that said pin and said side edge together form a cam mechanism for converting linear displacements of said control knob into pivotal movements of said two-arm lever.

11. A viewfinder according to claim 1, wherein:

said light-rays-directing optical system comprises a third reflective optical element disposed along an optical path between said objective lens and said focusing screen, for bending said optical path substantially at a right angle.

12. A viewfinder according to claim 11, wherein:

said third reflective optical element comprises a mirror.

13. A viewfinder according to claim 1, wherein:

said light-rays-directing optical system comprises a third reflective optical element disposed along an optical path between said focusing screen and said first reflective optical element, for bending said optical path substantially at a right angle.

14. A viewfinder according to claim 13, wherein:

said third reflective optical element comprises a mirror.

15. A diopter adjustment mechanism for use in a viewfinder of a camera, wherein the viewfinder comprises a plurality of optical elements including a movable optical element, and adjustment of a diopter of the viewfinder is achieved by liner displacement of said movable optical element along a predefined axis, said diopter adjustment mechanism comprising:

an optical element holder having a recess for receiving and holding said movable optical element;

a first mechanism provided on said optical element holder, for supporting and guiding said movable optical element for linear displacement along said axis;

a control knob provided for operation by a camera operator and supported for linear displacement; and a second mechanism for responding to operation of said control knob by causing linear displacement of said movable optical element along said axis so as to achieve adjustment of the diopter of said viewfinder, said second mechanism comprises a mechanism for converting linear displacement of said control knob into linear displacement of said movable optical element while providing demagnification of displacement between them.

16. A diopter adjustment mechanism for use in a viewfinder of a camera, wherein the viewfinder comprises a plurality of optical elements including a movable optical element, and adjustment of a diopter of the viewfinder is achieved by liner displacement of said movable optical element along a predefined axis, said diopter adjustment mechanism comprising:

an optical element holder having a recess for receiving and holding said movable optical element;

a first mechanism provided on said optical element holder, for supporting and guiding said movable optical element for linear displacement along said axis;

a control knob provided for operation by a camera operator and supported for linear displacement; and a second mechanism for responding to operation of said control knob by causing linear displacement of said movable optical element along said axis so as to achieve adjustment of diopter of said viewfinder, said second mechanism comprising:
  a two-arm lever mounted on said optical element holder for pivotal movement and having first and second arms in engagement with said control knob and said movable optical element, respectively; and
  a spring mounted on said optical element holder and normally urging said movable optical element so as to maintain engagement between said first arm and said control knob and engagement between said second arm and said movable optical element without any backlash in each engagement.

17. A diopter adjustment mechanism according to claim 16, wherein:

said control knob has a knob body and a pin extending from said knob body; said said first arm of said two-arm lever has a side edge, wherein said side edge is in engagement with said pin, wherein said side edge is shaped such that said pin and said side edge together form a cam mechanism for converting linear displacements of said control knob into pivotal movements of said two-arm lever.

18. A diopter adjustment mechanism according to claim 16, wherein:

said optical element holder has a pair of trunnions;

said two-arm lever has a pair of holes formed therein, for receiving said trunnions; and said spring is a helical torsion spring having a coiled portion fitted over one of said trunnions.

19. A diopter adjustment mechanism for use in a viewfinder of a camera, wherein the viewfinder comprises a plurality of optical elements including a movable optical element, and adjustment of a diopter of the viewfinder is achieved by liner displacement of said movable optical element along a predefined axis, said diopter adjustment mechanism comprising:

an optical element holder having a recess for receiving and holding said movable optical element;

a first mechanism provided on said optical element holder, for supporting and guiding said movable optical element for linear displacement along said axis;

a control knob provided for operation by a camera operator; and a second mechanism for responding to operation of said control knob by causing linear displacement of said movable optical element along said axis so as to achieve adjustment in diopter of said viewfinder, wherein said movable optical element comprises a triangular prism serving as a reflective optical element.

20. A diopter adjustment mechanism for use in a viewfinder of a camera having a photographing lens with an optical axis which defines a longitudinal axis of the camera, wherein the viewfinder comprises a plurality of optical elements including a movable optical element, and adjustment of a diopter of the viewfinder is achieved by linear displacement of said movable optical element, said diopter adjustment mechanism comprising:

an optical element holder having a recess for receiving and holding said movable optical element;

a first mechanism provided on said optical element holder, that supports and guides said movable optical element for linear displacement along an axis extending transversely with respect to said longitudinal axis;

a control knob provided for operation by a camera operator; and a second mechanism that responds to operation of said control knob by causing linear displacement of said movable optical element along said transverse axis so as to achieve adjustment of diopter of said viewfinder.

21. A diopter adjustment mechanism according to claim 20, wherein:

said control knob is supported for linear displacement; and said second mechanism comprises a mechanism that converts linear displacement of said control knob into linear displacement of said movable optical element while providing demagnification of displacement between them.

22. A diopter adjustment mechanism according to claim 20, wherein:

said control knob is supported for linear displacement; and said second mechanism comprises:

a two-arm lever mounted on said optical element holder for pivotal movement and having first and second arms in engagement with said control knob and said movable optical element, respectively; and a spring mounted on said optical element holder and normally urging said movable optical element to maintain engagement between said first arm and said control knob and engagement between said second arm and said movable optical element without any backlash in each engagement.

23. A diopter adjustment mechanism according to claim 22, wherein:

said control knob comprises a knob body and a pin extending from said knob body; and said first arm of said two-arm lever comprises a side edge, said side edge being in engagement with said pin, said side edge being shaped such that said pin and said side edge together form a cam mechanism for converting linear displacement of said control knob into pivotal movement of said two-arm lever.

24. A diopter adjustment mechanism according to clam 22, wherein:

said optical element holder has a pair of trunnions;

said two-arm lever has a pair of holes formed therein, for receiving said trunnions; and said spring is a helical torsion spring having a coiled portion fitted over one of said trunnions.

25. A diopter adjustment mechanism according to claim 20, wherein:

said movable optical element comprises a triangular prism serving as a reflective optical element.

\* \* \* \* \*